United States Patent
Ivanov et al.

(10) Patent No.: US 7,954,011 B2
(45) Date of Patent: May 31, 2011

(54) ENABLING TRACING OPERATIONS IN CLUSTERS OF SERVERS

(75) Inventors: Ventsislav Ivanov, Sofia (BG); Georgi N. Mihailov, Pleven (BG)

(73) Assignee: SAP AG, Walldorf (DE)

( * ) Notice: Subject to any disclaimer, the term of this patent is extended or adjusted under 35 U.S.C. 154(b) by 1057 days.

(21) Appl. No.: 11/541,119

(22) Filed: Sep. 29, 2006

(65) Prior Publication Data
US 2008/0155350 A1  Jun. 26, 2008

(51) Int. Cl.
*G06F 11/00* (2006.01)
(52) U.S. Cl. .......................... 714/45; 717/128
(58) Field of Classification Search ............... 714/45; 717/128
See application file for complete search history.

(56) References Cited

U.S. PATENT DOCUMENTS

| | | | |
|---|---|---|---|
| 5,371,883 A * | 12/1994 | Gross et al. ............ | 714/38 |
| 5,642,478 A * | 6/1997 | Chen et al. ............ | 714/45 |
| 5,896,536 A | 4/1999 | Lindsey | |
| 6,202,199 B1 | 3/2001 | Wygodny et al. | |
| 6,526,371 B1 | 2/2003 | Klein et al. | |
| 6,658,416 B1 | 12/2003 | Hussain et al. | |
| 6,678,883 B1 | 1/2004 | Berry et al. | |
| 6,708,173 B1 | 3/2004 | Behr et al. | |
| 6,766,511 B1 | 7/2004 | Berry et al. | |
| 6,802,054 B2 * | 10/2004 | Faraj ............... | 717/128 |
| 7,003,781 B1 * | 2/2006 | Blackwell et al. ........ | 719/327 |
| 7,140,025 B1 * | 11/2006 | Dillow et al. ........... | 719/313 |
| 7,165,190 B1 | 1/2007 | Srivastava et al. | |
| 7,194,664 B1 * | 3/2007 | Fung et al. ........... | 714/45 |
| 7,200,588 B1 | 4/2007 | Srivastava et al. | |
| 7,337,349 B2 * | 2/2008 | Brauneis et al. ........ | 714/4 |
| 7,380,239 B1 | 5/2008 | Srivastava et al. | |
| 7,392,505 B2 | 6/2008 | Ciapala et al. | |
| 7,441,234 B2 | 10/2008 | Cwalina et al. | |
| 7,640,459 B2 | 12/2009 | Ivanov et al. | |
| 2003/0009507 A1 | 1/2003 | Shum | |
| 2003/0061550 A1 * | 3/2003 | Ng et al. ............ | 714/45 |
| 2003/0065764 A1 * | 4/2003 | Capers et al. .......... | 709/224 |
| 2003/0088854 A1 | 5/2003 | Wygodny et al. | |
| 2003/0212928 A1 * | 11/2003 | Srivastava et al. ....... | 714/47 |
| 2004/0010570 A1 * | 1/2004 | Kaler et al. .......... | 709/220 |
| 2004/0117768 A1 | 6/2004 | Chang et al. | |

(Continued)

OTHER PUBLICATIONS

Non-Final Office Action for U.S. Appl. No. 11/540,348 Mailed Jan. 22, 2010, 18 Pages.

(Continued)

*Primary Examiner* — Scott T Baderman
*Assistant Examiner* — Chae Ko
(74) *Attorney, Agent, or Firm* — Blakely Sokoloff Taylor & Zafman

(57) ABSTRACT

A method and apparatus for enabling tracing operations in clusters of servers. An embodiment of a method includes receiving a first message at a first managed bean on a first server node of a cluster of servers, and enabling a performance trace of a computer application on the first server node in response to the first message, where the computer application is running on a plurality of server nodes of the cluster of servers, including the first server node and a second server node. The method further provides for sending a second message from the first managed bean on the first server node to a second managed bean on the second server node, and enabling the performance trace of the computer application on the second server node in response to receipt of the second message.

22 Claims, 7 Drawing Sheets

U.S. PATENT DOCUMENTS

| | | | |
|---|---|---|---|
| 2004/0153881 A1* | 8/2004 | Arend | 714/48 |
| 2004/0158819 A1* | 8/2004 | Cuomo et al. | 717/128 |
| 2004/0194066 A1* | 9/2004 | Frey et al. | 717/127 |
| 2004/0210877 A1 | 10/2004 | Sluiman et al. | |
| 2004/0220947 A1 | 11/2004 | Aman et al. | |
| 2005/0060408 A1 | 3/2005 | McIntyre et al. | |
| 2005/0091373 A1* | 4/2005 | Ciapala et al. | 709/224 |
| 2005/0120341 A1 | 6/2005 | Blumenthal et al. | |
| 2005/0132337 A1 | 6/2005 | Wedel et al. | |
| 2005/0283673 A1* | 12/2005 | Ode | 714/31 |
| 2006/0015612 A1* | 1/2006 | Shimazaki et al. | 709/224 |
| 2006/0085798 A1* | 4/2006 | Bendiksen et al. | 719/318 |
| 2006/0229064 A1 | 10/2006 | Pitkamaki et al. | |
| 2006/0288149 A1 | 12/2006 | La Vigne et al. | |
| 2007/0143795 A1* | 6/2007 | Tran | 725/46 |
| 2007/0260668 A1* | 11/2007 | Chen et al. | 709/201 |
| 2008/0098358 A1 | 4/2008 | Shekov | |
| 2008/0098359 A1 | 4/2008 | Ivanov et al. | |
| 2008/0127108 A1 | 5/2008 | Ivanov et al. | |
| 2008/0127110 A1 | 5/2008 | Ivanov et al. | |
| 2008/0155348 A1 | 6/2008 | Ivanov et al. | |
| 2008/0155349 A1 | 6/2008 | Ivanov et al. | |
| 2008/0155350 A1 | 6/2008 | Ivanov et al. | |

OTHER PUBLICATIONS

Non-Final Office Action for U.S. Appl. No. 11/540,028, Mailed Mar. 26, 2010, 29 Pages.

Non-Final Office Action for U.S. Appl. No. 11/529,978, Mailed Mar. 29, 2010, 26 Pages.

Non-Final Office Action for U.S. Appl. No. 11/529,980 Mailed Apr. 26, 2010, 23 Pages.

Final Office Action for U.S. Appl. No. 11/540,348 Mailed Jun. 23, 2010, 15 Pages.

Final Office Action for U.S. Appl. No. 11/540,028, Mailed Jul. 30, 2010, 16 Pages.

Final Office Action for U.S. Appl. No. 11/529,980 Mailed Aug. 4, 2010, 17 Pages.

Final Office Action for U.S. Appl. No. 11/529,978, Mailed Aug. 3, 2010, 16 Pages.

Borgeest, Rolf, et al., "A trace based performance evaluation tool for parallel real time systems", Nov. 2, 1994, 14 Pages.

Dufour, Bruno, et al., "J: A Tool for Dynamic Analysis of Java Programs", McGill University, Oct. 2003, 2 Pages.

Harkema, M, et al., "Performance Monitoring of Java Applications", University of Twente Netherlands, Jul. 2002, 14 Pages.

Turner, J D., et al., "Application Response Measurement of Distributed Web Services", IBM TJ Watson Research Center, 2002, 12 Pages.

Notice of Allowance and Fees for U.S. Appl. No. 11/529,978, Mailed Jan. 7, 2011, 18 Pages.

* cited by examiner

ENABLING TRACING OPERATIONS IN CLUSTERS OF SERVERS

TECHNICAL FIELD

Embodiments of the invention generally relate to the field of computer systems and, more particularly, to a method and apparatus for enabling tracing operations in clusters of servers.

BACKGROUND

In the operation of computers, it may be necessary to perform a trace of an application when issues arise in operation, such as when the application is not performing correctly or excessive memory is being consumed. For example, an incorrect result may be provided by the application, the application may require excessive execution time or memory consumption, or the application may otherwise provide operate in an inadequate manner. The result provided by the computer application isn't always helpful in determining what may have occurred in the operation of the computer application. In such circumstances, a performance trace will record the activities of the system during the operation of the application, which may assist in identifying the source of the problem.

However, in certain environments the operation of the application may be shared among various different system elements. In a specific example, the computer application may be shared in multiple nodes of a cluster of servers, with the cluster of servers appearing to the user as a single server in operation. In order to perform a trace of the full operation of the computer application, the operations that occur on each relevant system need to be traced.

In additional to other issues, the implementation of a performance trace on multiple nodes of a cluster requires the notification of each node to enable the tracing operation on each such node. The enablement of multiple nodes can create a burden on system administration, which may not be able to easily or efficiently access each node for the purpose of enabling the trace through the cluster of servers.

SUMMARY OF THE INVENTION

A method and apparatus for enabling tracing operations in clusters of servers.

In one aspect of the invention, a method includes receiving a first message at a first managed bean on a first server node of a cluster of servers, and enabling a performance trace of a computer application on the first server node in response to the first message, where the computer application is running on a plurality of server nodes of the cluster of servers, including the first server node and a second server node. The method further provides for sending a second message from the first managed bean on the first server node to a second managed bean on the second server node, and enabling the performance trace of the computer application on the second server node in response to receipt of the second message.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
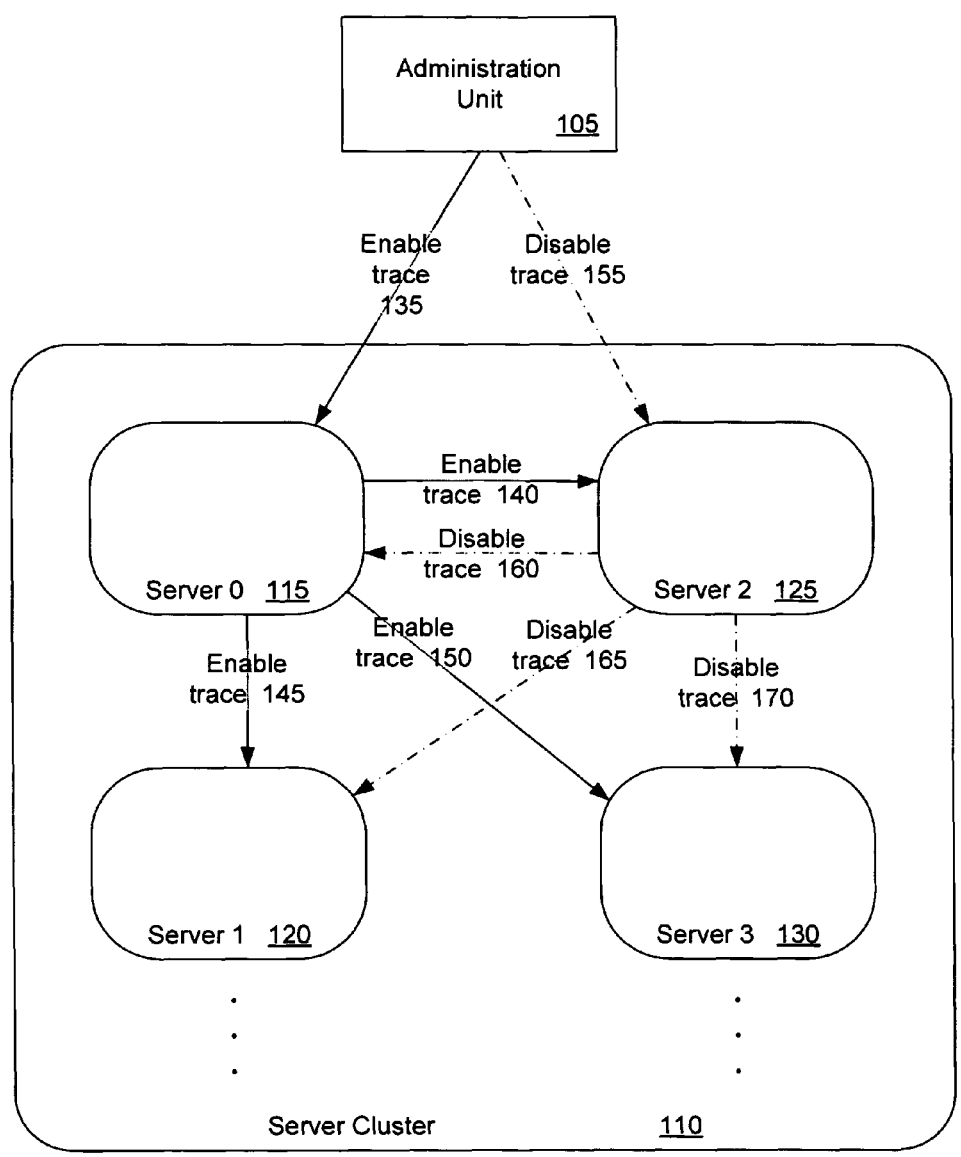
FIG. 1 is an illustration of an embodiment of enablement of a performance trace in a cluster of servers.

Embodiments of the invention are generally directed to tracing operations in multiple computer systems As used herein, a "trace" or "performance trace" is a process for obtaining data regarding the operation of a computer application. A "trace" includes a method to check the functioning of a computer program by obtaining the values of the variables used by the application in operation.

As used herein, an "end to end trace" is a trace that involves an application operating in multiple systems.

As used herein, an "administration system" or "administration unit" means a system for administration of a server. The duties of an administration system include the operation of traces of computer applications. An administration system includes the NetWeaver Administrator (NWA) of SAP AG, which is a web-based tool that provides an interface for the SAP NetWeaver system.

As used herein, a "cluster of servers" is a group of independent servers running operating collectively as a single system. In general, a cluster of servers appears to a client as a single server instance.

As used herein, "managed bean" or "MBean" is a Java program object to manage a resource, such as an application, a service, a component, or a device.

As used herein, a "URL" or "uniform resource locator" is an HTTP (Hypertext Transfer Protocol) address that specifies a resource on the Internet. A URL for an Internet resource instructs a browser program regarding where to the Internet resource.

In an embodiment of the invention, a trace is enabled on a computer application operating on multiple systems. In an embodiment, a trace operation that is enabled in a first system is communicated to a second system, and to other systems as needed. In an embodiment, only one system needs to receive the notification of the trace from a trace system in order for the trace to be enabled.

The administration system may include a trace manager or similar agent for the management of traces. In an embodiment, the trace manager enables the trace by sending a message to enable the trace on a first server in the cluster of servers. The first server then notifies a second server to enable the trace on the second server. In an embodiment, all servers in the cluster may be notified by notifying the first server, which then notifies each other server. In an embodiment, the disabling of the cluster of servers occurs in the same manner.

In an embodiment of the invention, a trace is enabled by an administration system on a cluster of servers. In an embodiment of the invention, a performance trace system includes an administration system, the administration system having duties that include the implementation and management of performance traces. The administration system includes modules for the operation of end to end traces, includes modules for the import of trace data from each type of system. The administration system further includes a JMX (Java management extensions) provider to provide JMX interfaces. JMX provides tools and APIs for monitoring and management of Java resources (applications, devices, and services). JMX provides a standard means to look into details of application performance. As used herein, JMX includes the relevant JMX standards, including the JMX v. 1.2 specification, which is included as a part of J2SE (Java 2 Standard Edition) 5.0, and any later specifications, as developed through JSR (Java Specification Request) 3—Java Management Extension Instrumentation and Agent Specification, and JSR 160—Java Management Extensions Remote API. JMX is utilized to instrument, manage, and monitor server components, including services, interfaces, and libraries, and computer applications. Using JMX, a resource is instrumented by one more MBeans. The MBeans are registered in an object server, the MBean server, that acts as a management agent. A JMX agent then consists of an MBean server and a set of services for handling MBeans. JMX then defines JMX connections that allow access to JMX agents from remote management applications. J2EE (Java 2 Platform, Enterprise Edition) conforms to the JMX architecture, and can be managed using JMX technology.

In computer service operations, a computer application may operate on multiple systems, with the operations on each contributing to the program operation. In one example, a web server may comprise a cluster of servers. In an example, a web server may comprise multiple J2EE systems, J2EE signifying a system developed according to the J2EE specification and related specifications. In such an environment, the computer application may operate on numerous different systems. If the computer application has problems in operation, a performance trace may be used to determine the source of the problem. However, a trace is needed for each system in the cluster of servers that may be included in the operation of the application.

In an embodiment of the invention, the enabling of tracing is distributed through multiple servers. In an embodiment, a trace manager of an administration system may notify a first server in a cluster of servers to enable the performance trace. In an embodiment of the invention, the trace is enabled on the notified first server, and the first server notifies a second server regarding the trace operation, thereby enabling the trace on the second server. If a third server or more servers are involved, the first server notifies each of the other servers to enable or disable the trace on such servers.

In one embodiment of the invention, an administration system is a Java administrator. In one particular example, the administration system may include the Visual Administrator of SAP AG. A user may request a performance trace for a computer application on a cluster of servers. In this example, each server may include an application trace service managed by an MBean object, with the server further including a JMX system including an MBean server. In an embodiment, the administrative service may communicate with one of the servers (Server 0) via an interface to an application trace service provided on the server. In such system, the administration system enables a performance trace on a server (Server 0) by sending an enable trace message via a Java messaging process. Upon receipt of the message, Server 0 enables the trace of the computer application. In an embodiment, Server 0 sends a message to a second server (Server 1), which is received by a message listener object. The process then can continue with each other server in the cluster of servers.

In an embodiment of the invention, an administration system is a web-based administrator. In a particular example, the administration system may include the NetWeaver Administrator (NWA) of SAP AG, a web-based interface to the administration and monitoring infrastructure of SAP systems. In this example, each server may include an application trace service managed by an MBean object, with the server further including a JMX system including an MBean server. In an embodiment, the administration service may enable a first server (Server 0) by an HTTP message to Server 0. In an embodiment, the HTTP message includes the URL of the computer application together with a parameter to enable the performance trace on Server 0. Upon receipt of the HTTP call, Server 0 enables the trace of the computer application. In an embodiment, the MBean of Server 0 is able to see each of the other MBeans of the other servers in the cluster. Server 0 forwards the trace enable request to a second server (Server 1) in an HTTP message. In an embodiment, the message may include the URL for the application under trace, together with a parameter for enablement of the trace by Server 1. The process then can continue with each other server in the cluster of servers.

In an embodiment of the invention, the disabling of a trace is also distributed. The disabling of a performance trace may be accomplished in the same manner as the initialization of the trace. In an embodiment, the trace manager may notify any server in the cluster, with the remaining servers being notified regarding the termination of the trace by the other servers.

In an embodiment of the invention, data for a performance trace is correlated to connect the data to the trace. In an embodiment, an element which may be referred to as a "passport" is sent with communications to identify and distinguish the end to end trace. In an embodiment, the passport includes a unique correlation ID that is used to correlate data for any particular performance trace. In an embodiment, the passport is a DSR (distributed statistics record) passport, where distributed statistics records are records to enable monitoring of the performance of a system. The DSR passport may be created on the first system on which tracing begins, and distributed with the trace such that the correlation ID is passed to each system. In an embodiment, the distribution of the passport may be utilized in multiple different types of systems, including, for example, J2EE systems and the SAP ABAP system. In an embodiment of the invention, an end to end trace of a computer application is implemented by correlating the traces in each system to allow formation of an overall trace result, with a passport being sent together with every communication for the end to end trace in the format that is appropriate for each traced system.

In an embodiment of the invention, the process of correlation varies with the system and tracing process. In an embodiment of the invention, correlation objects may be used to identify the path of a user activity and then to display which systems are involved. In JARM (Java Application Response Time Measurement) and SQL traces an end to end trace may operate with the assistance of a trace correlator object that is used to analyze trace records that originate from different software components.

A correlator defines a semantic group, which may be used to assist in understanding how traces relate to each other. In an example, a user activity for an application may trigger several requests that are processed by multiple different components. In an embodiment, a system will run an application on multiple systems, collect traces from each of the systems, and merge and analyze the traces. In this process, abstract correlated objects are introduced to allow end-to-end analysis of the user objects, which may be processed by many components running on various different host systems. The correlation objects are used to combine trace data from different sources, and may be serialized over a network and transferred via the appropriate metadata for each communication protocol. The correlators for each trace may include, for example, a passport identification, a user name (to attach the trace to a particular user), and a transaction name (to identify a particular transaction, such as particular run of an application).

In one embodiment, a trace may be a part of an end to end trace in which multiple different types of systems are subjected to a trace. For example, an embodiment of a system may provide for distributed enabling of an end to end trace in a distributed environment of a web application server. Another system that is subject to a trace may be, for example, a proprietary system such as the ABAP (Advanced Business Application Programming) system of SAP AG.

In an embodiment of the invention, distributed enabling of a trace is implemented by notifying one of multiple systems that are involved in a trace, with the notified system then notifying another system. In an embodiment, a tracing administrator notifies a first system of multiple systems regarding the trace, and the system is then enabled for the trace. The first system then notifies a second system, which then is enabled for the trace. The process may continue with other systems being notified, either by the first system or by the second system.

In an embodiment of the invention, distributed enabling of tracing is via the use of a JMX call that is forwarded throughout the system. In an embodiment of the invention, a web application server operates as a cluster of servers. The web application server may include an SAP web application server. In an embodiment, a JMX call can be forwarded to any one of the server nodes, which results in enabling a session trace on every server in the cluster.

In an embodiment of the invention, a session trace is enabled in a whole cluster transparently for a system user. In an embodiment of invention, a message service of the web application server utilizes JMX technology that requires a request for enabling to be sent only once, with the result being that every server in the cluster will be enabled, and the session trace will then being to wait for requests for tracing. In an embodiment of the invention, a trace may be ended in the same fashion, by sending a message to a server, which results in each other server being notified of the message to end the trance. In an embodiment, a process provided for enabling a trace on multiple servers in a cluster of servers by notifying any one of the servers. The notification of any system results in forwarding of the enabling message to all of the other server nodes in the cluster of servers. Disabling the trace is also handled by sending a request to any one of the traces.

In a system, there may be multiple instances of the node and multiple physical servers represented in each node. Each server may include an application that is the subject of a trace. In an embodiment of the invention, an administration may send an enablement mote to the MBean of any server in the J2EE system. The MBean will notify each of the MBeans in each of the other servers, thereby enabling each of servers. The dispatcher may send a request to any of the servers as appropriate for the dispatch operations, including any load balancing consideration.

In a particular embodiment of the invention, a vendor may provide a customer with a solution that operates on separate systems, with such systems being in communication with each other. For example, a user call may go to a Java stack of a web application server on one system, and a call to ABAP stack of another system may then be made. If the application does not operate properly, it may be difficult to determine on which system the problem has occurred, or what exactly the problem is. In an embodiment of the invention, an end to end trace starts different traces on all of the systems in the cluster of servers in order to provide data from all of the involved systems that may relate to the problem. In an embodiment of the invention, correlation objects are used to identify the path of a user activity and then to display which systems are involved. In an embodiment of the invention, an end to end trace may use common trace format for storing trace data to assist in troubleshooting. (The common format may be referred to as common performance trace, or CPT.) The resulting trace data is stored in a database of a central system, which may be in the common trace format, where the data can be analyzed in multiple different ways.

In an embodiment of the invention, an end to end trace of a computer application is implemented by correlating the traces in each system to allow formation of an overall trace result. In an embodiment, an end to end trace operates with the assistance of a trace correlator object, which is used to analyze trace records that originate from different software components. A correlator defines a semantic group, which may be used to assist in understanding how traces relate to each other. In an example, a user activity for an application may trigger several requests that are processed by multiple different components. In an embodiment, a system will run an application on multiple systems, collect traces from each of the systems, and merge and analyze the traces. In this process, abstract correlated objects are introduced to allow end-to-end analysis of the user objects, which may be processed by many components running on various different host systems. The correlation objects are used to combine trace data from different sources, and may be serialized over a network and transferred via the appropriate metadata for each communication protocol. The correlators for each trace may include, for example, a passport identification (as described further below), a user name (to attach the trace to a particular user), and a transaction name (to identify a particular transaction, such as particular run of an application).

In an embodiment of the invention, a performance trace system includes an administration system, the administration system having duties that include the implementation and management of end to end traces. The administration system includes modules for the operation of end to end traces, includes modules for the import of trace data from each type of system. The administration system further includes a JMX (Java management extensions) provider to provide JMX interfaces. JMX is utilized to instrument, manage, and monitor server components, including services, interfaces, and libraries, and computer applications.

In an embodiment of the invention, a data element, which may be referred to as a "passport", is sent with communications to identify and distinguish the end to end trace. In an embodiment, a common identifier is needed for traces to connect the traces to a particular trace session. In an embodiment, the passport is a DSR (distributed statistics report) passport, where distributed statistics reports are records to enable monitoring of the performance of a system. The DSR passport may be created on the first system on which tracing begins, and distributed with the trace. In an embodiment, the distributed reports may be utilized in multiple different types of systems, including, for example, J2EE systems and the SAP ABAP system. In the embodiment, the passport is sent together with every communication for the end to end trace in the format of each traced system. For example, in ABAP the passport is a specific correlator object existing in an ABAP word and which corresponds to a particular a new LUW (logical unit of work). In the Java stack the passport is maintained by the DSR service and corresponds to a security session. The passport may include a GUID, which is a unique identifier or key for the trace session. If other types of systems are involved in a performance trace, the passport would be supported by as required in the system.

In a possible example, a user may run a process on multiple systems and determine that an error or other issue has arisen with regard to such process. The user then may select the systems to be traced from an administration system and start a new trace activity. The user may further select the types of traces to be run. The user then runs any relevant test cases, and each monitored system traces all actions within the trace request. The user may then stop the trace activity. The system then collects and merges the trace data from all of the selected systems to allow for analysis of the collected data. The resulting combine result then may be viewed by the user.

In an embodiment of the invention, a system may optionally include an HTTP proxy for use in collecting client statistics. In an embodiment, an HTTP proxy listens to requests from a browser to the system in order to measure time that is lost in network communication. If an HTTP proxy is used, client data is uploaded to the administration system. In an example, an HTTP proxy application may be installed on a system, such as specifically in a computer on which a browser is opened for the operation of a trace. The proxy may be used to measure client rendering and network traffic after a response from a server is returned. In this example, resulting end data then may include HTTP requests with duration time values for rendering time, network time, and server time.

In an embodiment of the invention, a monitored system includes such import modules as are needed to generate and transfer trace data for the relevant systems. For example, a J2EE monitored server includes an MBean (managed Java bean) server, and utilizes an MBean to provide trace models. In an embodiment of the invention, an ABAP monitored server includes a CCMS (Computer Center Management) agent and an administration system includes a CCMS system. CCMS refers to the ABAP based monitoring infrastructure of SAP AG. Other types of servers may include other types of import modules needed to obtain and transfer data collected in trace operations.

In an embodiment of the invention, an end to end trace result is generated from the correlated traces of multiple different systems. The trace result may be represented as a display for a user. The display of trace results may include display that illustrates how the time was used in the application operation and how it was distributed among different application elements.

In an embodiment of the invention, a user interface may be provided for a user to request traces and to obtain the results for analysis. In an embodiment, the user interface may utilize a web-based system, and may operate in conjunction with a web-based administration unit. This may be implemented as, for example, a Web Dynpro application in a NetWeaver administrator plug-in. However, embodiments of the invention are not limited to any particular interface process for a user.

FIG. 1 is an illustration of an embodiment of enablement of a performance trace in a cluster of servers. In this illustration, the operation of an administration unit 105 includes the management of performance traces on computer systems. In an embodiment, a system includes a cluster of servers 110, which includes multiple server nodes shown as server 0 115, server 1 120, server 2 125 and server 3 130. The operation of a computer application may run on any one or more of the server nodes.

In an embodiment of the invention, the administration unit enables a trace by notifying one of the server nodes in the cluster of servers 110. The server then provides notice to each of the other server nodes to enable the trace through the cluster. For example, the administration unit 105 sends a message to enable the trace 135 to server 0 115. In an embodiment, the administrative unit may be a web-based tool, and may enable the trace by sending a JMX message to server 0 115. In an embodiment, the server nodes in the cluster of servers may be Java-based servers utilizing an MBean for management, with the MBean of server 0 receiving the message to enable the trace 135. The MBeans of other servers are exposed to the MBean of server 0 115. In an embodiment of the invention, server 0 115 can enable the trace on the other servers in the cluster of servers by sending a message to enable to each of the other servers, shown as an enable trace message 145 sent to server 1 120, an enable trace message 140 sent to server 2 125, and an enable trace message 150 to server 3 130. In an embodiment, each of the messages is a JMX message sent a managed bean of a server node. In this manner, each of the servers in the cluster receives a message to enable the trace, while the administration unit 105 is only required to provide notification to any one of the servers in the cluster.

In an embodiment of the invention, the disabling of traces is accomplished in a similar fashion as the enablement of traces. As illustrated, the administration unit 105 may send a JMX message to disable the trace 155 to a server node in the cluster of servers, such as server 2 125. Any of the servers may receive the message, depending on which server node is chosen by the dispatcher. Server 2 125 then can view the other servers, and provides a message to disable the trace to each of the other server nodes. As illustrated, server 2 125 provides a disable trace message 160 to server 0 115, a disable trace message 165 to server 1 120, and a disable trace message 170 to server 3. In this manner, each of the servers in the cluster receives a message to disable the trace, while the administration unit 105 is only required to provide notification to any one of the servers in the cluster.

In an embodiment of the invention, each message sent regarding the trace includes a correlation object. In an embodiment of the invention, the correlation object is used to correlate the trace so that the data collected for the trace is recognized.

Figure 2:
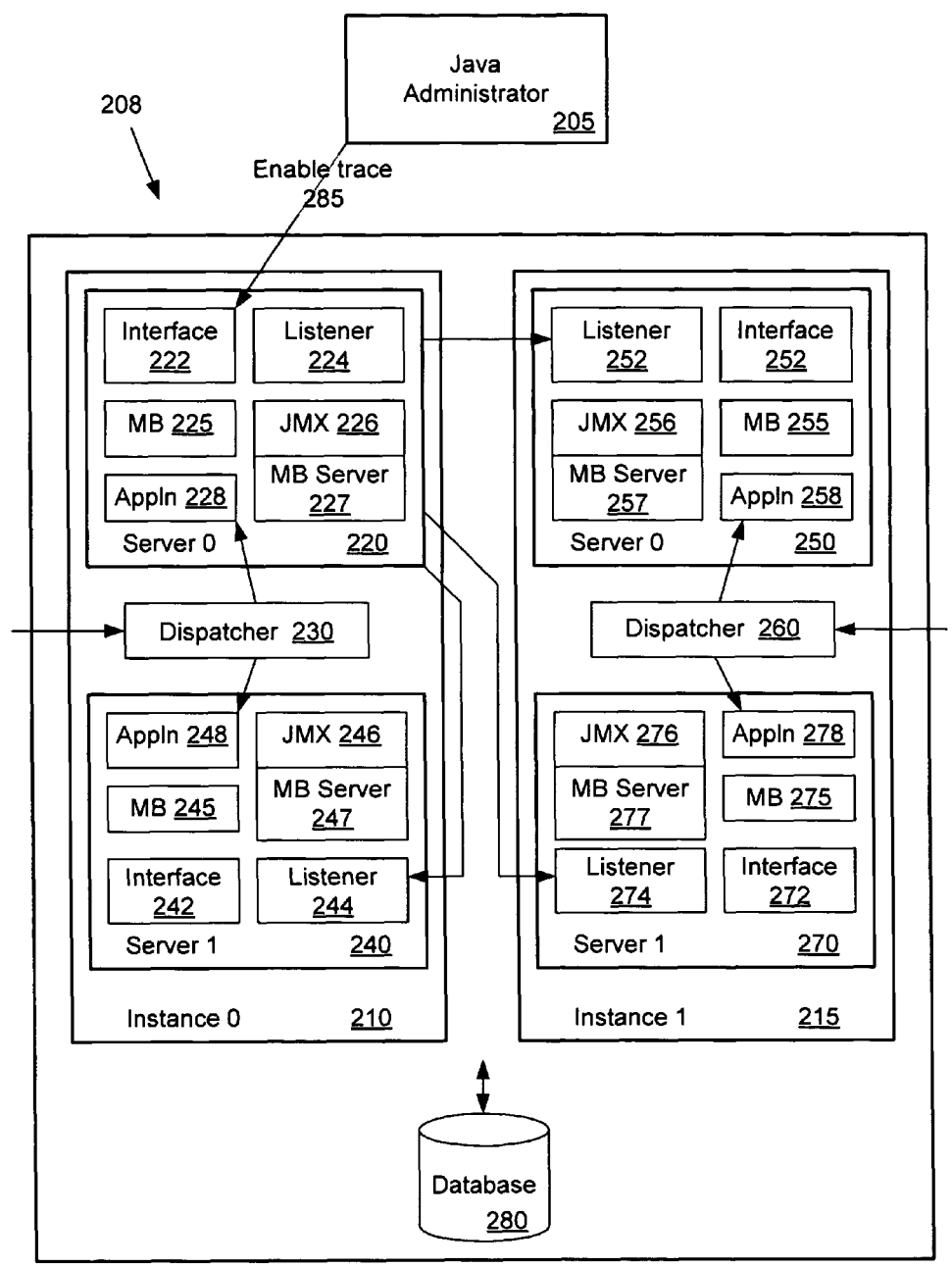
FIG. 2 illustrates an embodiment of a system to enable a performance trace in a cluster of servers.

FIG. 2 illustrates an embodiment of a system to enable a performance traces in a cluster of servers. In this illustration, an administration unit is the form of a Java administrator 205. The Java administrator 205 has, among other duties, the responsibility for managing performance trace operations for a cluster of servers 208. While a cluster of servers may be in various forms and may include any number of servers, for the purposes of this illustration the cluster of servers includes a server instance 0 210, including server nodes server 0 220 and server 1 240, and a server instance 1 275, including server nodes server 0 255 and a server 1 275. Each server node has access to a database 280 for server operations. Each server may include an instance of the application, as dispatched by dispatcher 230 for instance 0 210 (application 224 for server 0 220 and application 244 for server 1 240) and as dispatched by dispatcher 260 for instance 1 215 (application 254 for server 0 250 and application 274 for server 1 270). The servers may access database 280 to store and obtain certain data, which data may include trace data resulting from a performance trace.

In addition, each server requires a managed bean for server management, together with an interface to provide a connection with the administrator 205 and a listener service to listen for messages. For instance 0 210, this is illustrated as interface 222, MBean 226, and listener service 228 for server 0 220 and interface 242, MBean 246, and listener service 248 for server 0 240. For instance 1 215, this is illustrated as interface 252, MBean 256, and listener service 258 for server 0 250 and interface 272, MBean 276, and listener service 278 for server 0 270. A listener is utilized by each server to detect messages from other elements.

In an embodiment of the invention, the administrator 205 is required to enable a trace on the servers contained within the cluster of servers 208. While the cluster of servers 208 appears as a single server to a client, the cluster includes multiple server nodes, each of which needs to be notified regarding the enablement of the trace. In this embodiment, the administrator utilizes the interface of a server to provide a command to enable the trace of the system 285, such as the provision of a message via interface 222 of server 0 220 in instance 0 210. The server that receives the message may be chosen by a dispatcher, shown as dispatcher 230 and 260. In this environment, the managed bean 226 of server 0 220 of instance 0 210 then may send messages to the other servers in the cluster of servers 208 to enable the trace on each such server. As structured, the messages are detected by the listener service of each of the other servers, such listeners being listener service 248 of server 1 240 of instance 0 210, and listener services 258 and 278 of server 0 250 and server 1 270 respectively of instance 1 270. In this manner, the administrator is required to provide only a message to a single server node, and the server node then forwards the message to each other server node in the cluster of servers 208.

In an embodiment of the invention, the stopping of a trace operation is handled in the same fashion as the enablement of a trace. Again, the administrator 205 would provide a message via an interface to one of the servers, as selected by a dispatcher, and then the message to stop the trace is transferred to each server node in the cluster of servers 208.

Figure 3:
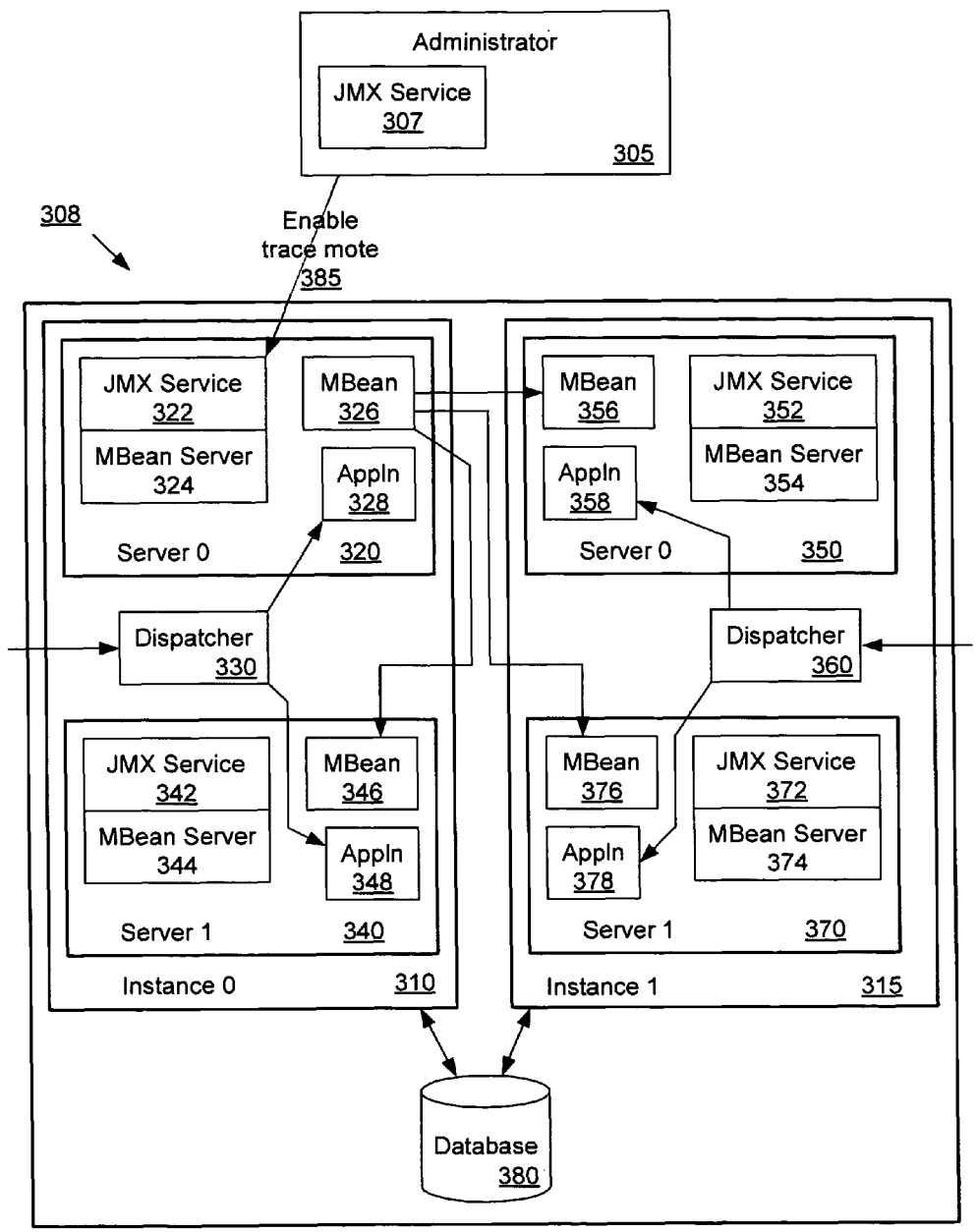
FIG. 3 illustrates an embodiment of a system to enable a performance trace in a cluster of servers.

FIG. 3 illustrates an embodiment of a system to enable a performance traces in a cluster of servers. In this illustration, a system administrator 305 may be in the form of a web-based tool for administration, such as the NetWeaver Administrator of SAP AG. Among other operations and duties, the administrator 305 may be responsible for management of performance traces for server nodes within a cluster of servers 308.

In an embodiment of the invention, the administrator includes a JMX service, and may communicate with the cluster of servers via JMX messages. In order to enable a performance trace on all servers within a cluster of servers 308, the administrator 305 provides a JMX message to enable a trace mote 385 to any one of the servers in the cluster 308. The server that receives the message may be chosen by a dispatcher, as shown as dispatcher 330 and dispatcher 360. As illustrated, each server node includes certain components relevant to the operation of a performance trace. For server 0 320 and server 1 340 of instance 0 310 and server 0 350 and server 1 370 of instance 1 315, the elements may include, but are not limited to, an instance of the application that is subject to a performance trace (328, 348, 358, 378), a JMX service (322, 342, 352, 372), which will support messaging, a managed bean (326, 346, 356, 376) and the supporting managed bean server (324, 344, 354, 374). For example, the JMX message may be received by the managed mean 326 of server 0 320 of instance 0 310 via the operation of the JMX service 322. In an embodiment, MBean 326 is able to see each of the other managed beans (MBean 346, 356, and 376) and can provide a JMX message directly to each such object via the JMX service of each server node, thereby transferring the message to enable the performance trace to each of the other servers. In an embodiment, the performance trace then is enabled and may be performed throughout the cluster of servers 380. In an embodiment of the invention, the use of JMX messaging allows the receipt of the message by MBean 326 without an interface to the administrator, and the transfer of the message to other server nodes without providing a listener service on each such server node.

In an embodiment of the invention, the stopping of a trace operation is handled in the same fashion as the enabling of a trace. In this operation, the administrator 305 would provide an HTTP message to one of the servers in the cluster of servers 308, and the message to stop the trace would be transferred to each other server in the cluster.

The servers are each coupled with a database 380 to store and obtain certain data, which data may include trace data resulting from a performance trace. In an embodiment of the invention, the distributed enablement of a performance trace illustrated in FIG. 3 is a part of an end to end trace of multiple systems, with the other system or systems not being shown in the figure. In an embodiment of the invention, the administrator 305 is responsible for enabling the performance trace on the other system or systems in addition to providing an enablement message to one of the servers in the cluster of servers 308. In an embodiment, the trace data stored in the database 380 may be combined with other trace data collected from other types of systems in an end to end trace to form a joint data source for the trace.

Figure 4:
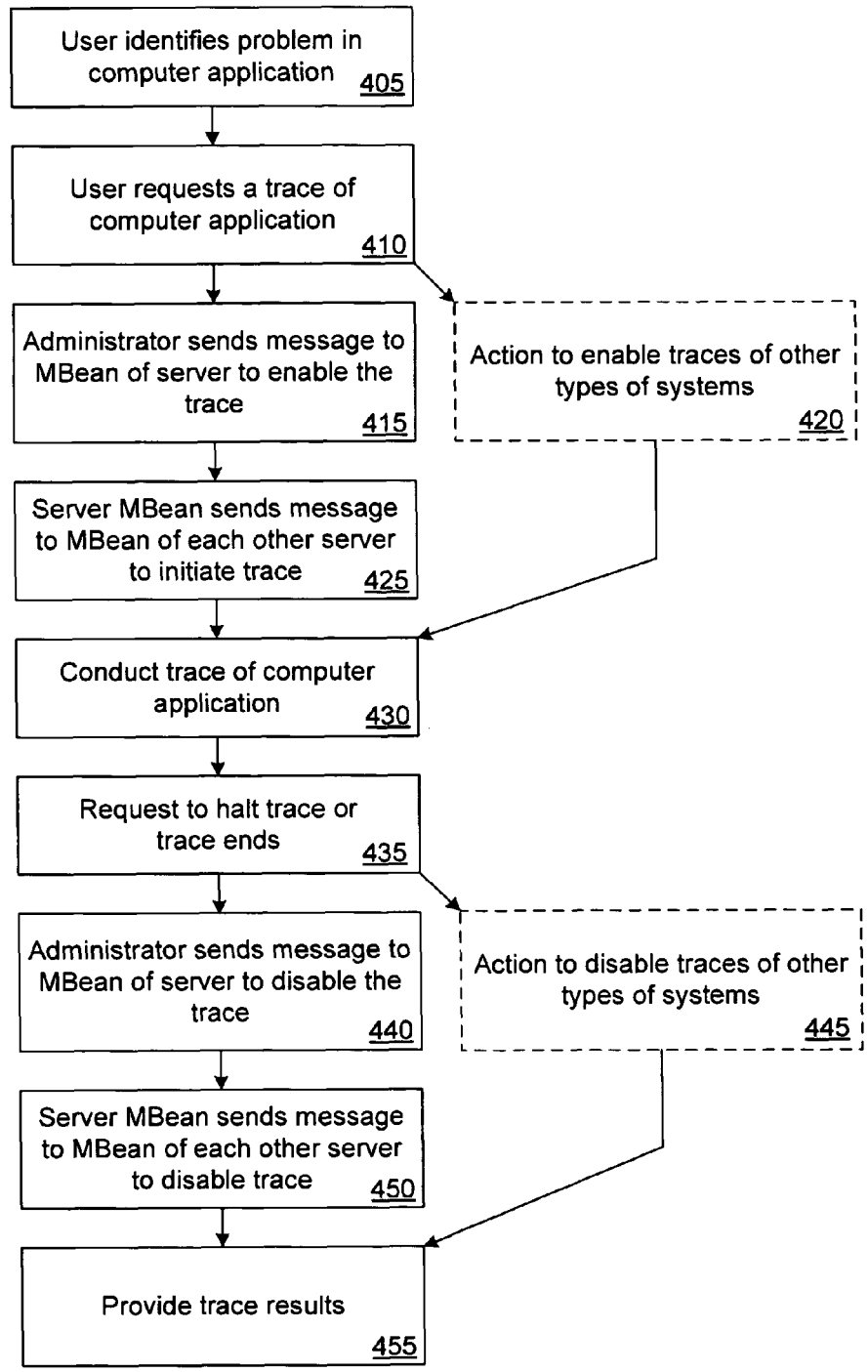
FIG. 4 is a flowchart to show an embodiment of a process for enablement of performance traces in a cluster of servers.

FIG. 4 is a flowchart to show an embodiment of a process for enablement of performance traces in a cluster of servers. In an embodiment of the invention, a user may identify a problem in a computer application 405. The user then may request a performance trace of the computer application 410 in order to make a determination why the application is not performing properly. In response to the request, an administrator sends a message to an MBean of a server to enable the trace 415. In an embodiment, the message is a JMX message received by the MBean of the server. In an embodiment, the administrator may support an end to end trace, and the enablement of the trace in the cluster of servers may occur in parallel with actions to enable traces on one or more other systems 420.

In an embodiment of the invention, the MBean of a server receiving a message from the administrator to enable the trace then sends the trace enable message to the MBeans of each of the other servers in the cluster of servers 425. This process enables the trace on each of the server nodes of the cluster of servers. The computer application is then run and the trace of the computer is conducted on each server 430. Upon receiving a request to stop the trace or upon the trace otherwise ending, such as after a specified time period 435, the administrator sends a message to the MBean of a server instructing the server to disable the trace 440. If the trace is a part of an end to end trace of multiple different types of systems, the administrator may also take such action as is required to disable the trace on the other system or systems 445. The MBean receiving the message to disable the trace then sends the trace to the MBean of each other server in the cluster of servers 450. In an embodiment, the process for disabling a trace is the same or similar to the process for enabling the trace. The trace results then may be made available for provision to the user 455, with such results including the trace data from the trace of each server in the cluster of servers. In an embodiment of the invention, the trace may be a part of an end to end trace, and thus may be combined with trace data from the other system or systems that are a part of the end to end trace.

Figure 5:
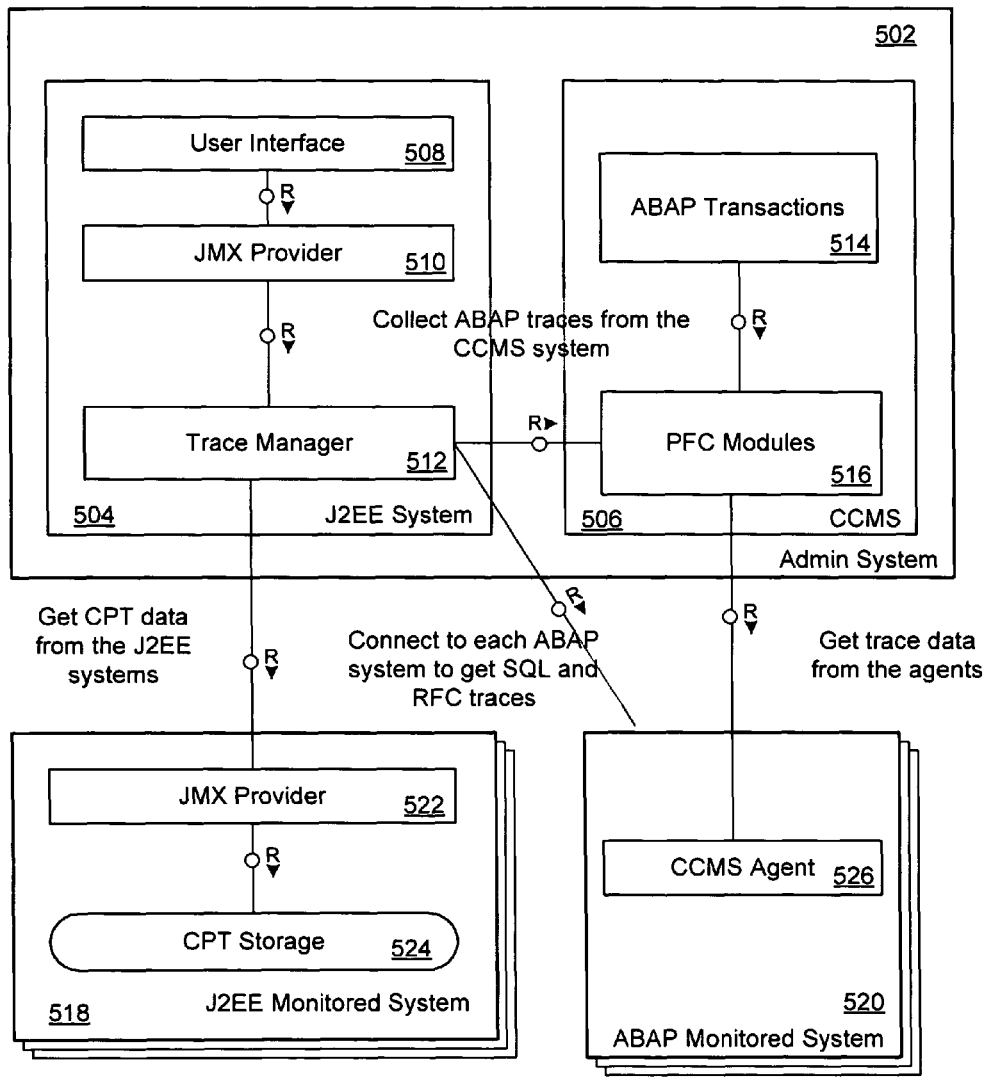
FIG. 5 illustrates an embodiment of a trace system.

FIG. 5 illustrates an embodiment of a trace system. In this illustration, an administration system 502 is responsible for implementing an end to end trace of a computer application, where the computer application includes components running on multiple systems. For example, in the implementation of a trace there may be one or more J2EE monitored systems 518 and one or more ABAP monitored systems 520. In an embodiment, the administration unit may operate as a Web-based tool for administration. The administration system 502 may include a J2EE system element and a CCMS element 506. Within the J2EE element 504 of the administration system 502 there may be a user interface 508, which may include, but is not limited to, a Web Dynpro application. The user interface 508 is coupled with a JMX provider, which may provide for messaging. The J2EE element 504 then includes a trace manager 512 to manage operations. The administration system 502 further includes a CCMS system, including a module for ABAP transactions 514 and PFC modules 516.

In an embodiment of the invention, the trace manager 512 is to generate one or more parameters for a trace session upon request from a user. In an embodiment, the parameters uniquely identify the trace system such that the trace session can be correlated, and may reduce interference with other systems.

In the illustrated embodiment, the trace manager 512 of the administration system 502 is coupled with each J2EE monitored system 518 via a JMX provider 522 to obtain Java system trace data. The J2EE monitored systems each include a storage for trace data, which may include a common trace format data storage shown as the CPT storage 524. The administration system is further coupled with each ABAP monitored system 520 to obtain ABAP trace data. Each ABAP monitored system includes a CCMS agent 526, which provides for communication with the CCMS system 506 of the administration system 502. In an embodiment, the format of the ABAP system traces may vary and may require translation to a common trace format, such as CPT.

In an embodiment of the invention, the administration system is to enable a trace on each affected J2EE monitored system 518 and ABAP monitored system 520. Each such system will trace the application operation, and collect the relevant trace data. The administration system 502 via the trace manager 512 will gather the trace data from each system, correlate the data together, and create a result reflecting an end to end trace of the application.

In an embodiment of the invention, the trace is started by calling a URL for the relevant computer application, together with the one or more parameters that have been generated by the trace manager for the trace session. In an embodiment of the invention, the trace may also be stopped by called the URL and the generated parameters.

Figure 6:
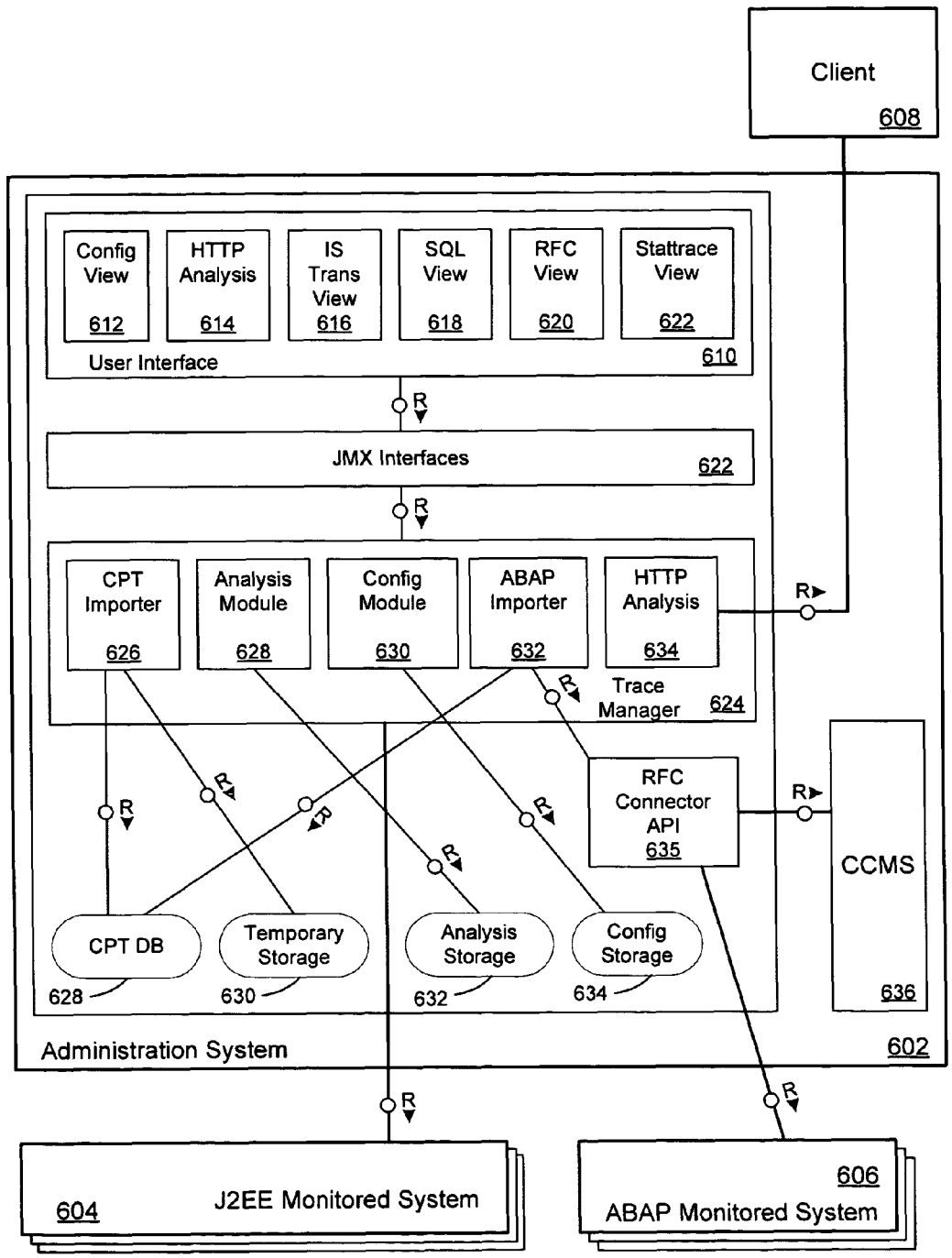
FIG. 6 is an illustration of an embodiment of an administration system that implements end to end traces.

FIG. 6 is an illustration of an embodiment of an administration system that implements end to end traces. The illustrated trace system provides details for an embodiment of system that may include the elements illustrated in FIG. 5. As illustrated, an administration system 602 is responsible for trace operations for a client 608 operating an application on one or more J2EE monitored systems 604 and one or more ABAP monitored systems 606. The J2EE monitored systems are coupled with a trace manager 624, and the ABAP monitored systems 606 are coupled to a CCMS system 636 via an RFC connector API 635. The API 635 is a proxy of the RFC function modules and creates a general framework for connection to the ABAP systems. The API connects to the CCMS system on administration system and to all ABAP monitored systems.

In this illustration, the trace manager 624 includes a number of modules for trace operations. The trace manager may include a configuration module 630, which contains methods for starting and stopping trace activities, and that maintains general information about the trace activities (such as name, start and end data, and filters) in a configuration storage 634. The modules may include an ABAP importer 632 to import the ABAP trace data via the RFC connector API 635 to a database 628, which may be a CPT (common performance trace) database. In addition, the trace data from the J2EE monitored systems 604 is stored in a temporary storage 630. The trace manager further includes a CPT importer 626, which obtains the trace data from the J2EE monitored systems 604 stored in the temporary storage, and imports the data to the database 628.

In one embodiment, the trace manager 624 may include a HTTP analysis module. If an HTTP proxy is used on the client side 608, then several XML files will be generated. These files are uploaded to the administration system 602, and, with the help of a responses.trc file that is generated by the HTTP service, the HTTP analysis is generated and imported to the database 628.

After the trace is stopped, the trace data is collected from the monitored system and imported to the database 628. In an embodiment, this data may then be analyzed by the analysis module and may be stored in a separate analysis storage 632.

Also illustrated are the JMX interfaces 622 to provide the link between the trace manager 624 and a user interface 610, which may include a Web Dynpro application. Contained within the user interface may be multiple views for the user to perform traces and analyze results, including a configuration view 612, an HTTP analysis view 614, an IS (Introscope) transactions view 616, a SQL view 618, an RFC view 620, and a Stattrace view 622.

Figure 7:
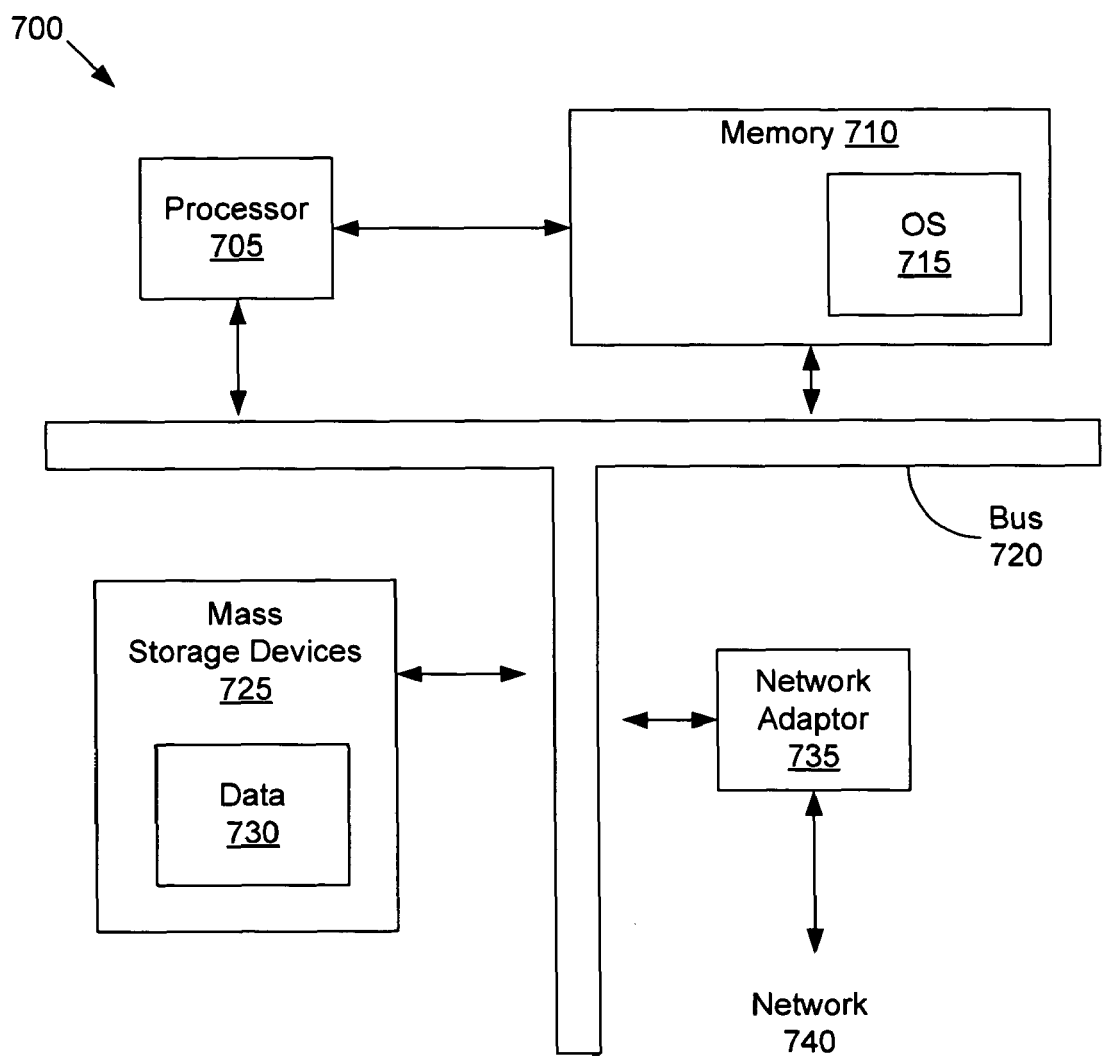
FIG. 7 is an illustration of a computer system that may be utilized in an embodiment of the invention.

FIG. 7 is an illustration of a computer system that may be utilized in an embodiment of the invention. FIG. 7 may represent a system on which an application is run, or another portion of a server system. As illustrated, a computing system 700 can execute program code stored by an article of manufacture. The computing system illustrated in FIG. 7 is only one of various possible computing system architectures, and is a simplified illustration that does include many well-known elements. A computer system 700 includes one or more processors 705 and memory 710 coupled to a bus system 720. The bus system 720 is an abstraction that represents any one or more separate physical buses, point-to-point connections, or both connected by appropriate bridges, adapters, or controllers. The bus system 720 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 7, the processors 705 are central processing units (CPUs) of the computer system 700 and control the overall operation of the computer system 700. The processors 705 execute software stored in memory 710. A processor 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 710 is or includes the main memory of the computer system 700. Memory 710 represents any form of random access memory (RAM), read-only memory (ROM), flash memory, or the like, or a combination of such devices. Memory 710 stores, among other things, the operating system 715 of the computer system 700.

Also connected to the processors 705 through the bus system 720 are one or more internal mass storage devices 725 and a network adapter 735. Internal mass storage devices 725 may be or may include any conventional medium for storing large volumes of instructions and data 730 in a non-volatile manner, such as one or more magnetic or optical based disks. The network adapter 735 provides the computer system 700 with the ability to communicate with remote devices, over a network 750 and may be, for example, an Ethernet adapter.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
generating by a system administration unit a message to request enabling a performance trace of a computer application, the computer application running on a plurality of server nodes of a cluster of servers;
selecting by a dispatcher a single server node of the plurality of server nodes for receipt of the message to enable the performance trace and transmitting the message only to the selected server node, wherein the selected server node may be any of the plurality of server nodes;
receiving the message at a managed bean on the selected server node;
enabling a performance trace of the computer application on the selected server node in response to receipt of the message;
forwarding the message from the managed bean of the selected server node to a managed bean of each other server node of the plurality of server nodes to enable the performance trace on each server node of the plurality of server nodes;
enabling the performance trace of the computer application on each of the other server nodes in response to the forwarded message from the selected server node;
performing the performance trace of the computer program on each of the server nodes of the plurality of server nodes; and
storing a set of trace data obtained from the performance trace.

2. The method of claim 1, wherein the message to enable the performance trace received by the selected server node and the forwarded message sent by the selected server node to the other server nodes are JMX (Java management extensions) messages.

3. The method of claim 1, wherein the message to enable the performance trace is received without the selected managed bean having a message interface with the system administration unit.

4. The method of claim 1, wherein the forwarded message from the selected server node is sent to the managed bean of each of the other server nodes without use of a message listener object on the managed beans of the other server nodes.

5. The method of claim 1, wherein the selection by the dispatcher of the server node for receipt of the message to enable the performance trace from among any of the plurality of server nodes is based on load balancing considerations.

6. The method of claim 1, further comprising performing a trace of the computer program in a second system, the system having a different computer environment than the servers in the cluster of servers, storing a second set of trace data obtained from the trace of the second system, and combining the set of data obtained from the performance trace of the computer program on the cluster of servers and a set of data obtained from the performance trace of the computer program on the second system.

7. The method of claim 1, further comprising:
subsequent to the enabling of the performance trace on the plurality of server nodes, selecting by the dispatcher a single server node of the plurality of server nodes for receipt of a message to request disabling the performance trace and transmitting the message to disable the performance trace only to the selected server node, wherein the server node selected for the message to disable the performance trace may be any of the plurality of server nodes;

receiving the message to disable the performance trace at a managed bean of the selected server node;

forwarding the message to disable the performance trace from the managed bean of the server node selected for the disable message to a managed bean of each of the other server nodes of the plurality of server nodes; and disabling the trace session at each server node of the plurality of server nodes in response to receipt of the message to disable the performance trace.

8. The method of claim 7, wherein the server node selected for the message to disable the performance trace is not the selected server node for the receipt of the message to enable the performance trace.

9. The method of claim 1, wherein the managed bean of each server node of the plurality of server nodes is visible to the managed beans of each of the other server nodes of the plurality of server nodes.

10. A performance trace system comprising:

an administration unit, the administration unit including a trace manager to manage traces of computer applications, the trace manager to generate a message to enable a performance trace of a computer application running on a plurality of server nodes for each of the plurality of server nodes; and a dispatcher to select a single server node of the plurality of server nodes for receipt of the message to enable the performance trace of the computer application;

wherein a managed bean on the selected server node is the only server node to receive the message to enable the performance trace from the trace manager, the managed bean to forward the message to each of the other server nodes of the plurality of server nodes to enable the performance trace on each of the plurality of server nodes; and wherein a managed bean on each other server node of the plurality of server nodes receives the message forwarded from the selected server node and each other server node enables the trace of the computer application in response to the receipt of the message forwarded from the selected server node.

11. The performance trace system of claim 10, wherein the administration unit is a Web-based tool.

12. The performance trace system of claim 10, wherein the message to enable the performance trace is a JMX (Java management extensions) message.

13. The performance trace system of claim 10, wherein subsequent to the enabling of the performance trace the trace manager is to further generate a message to disable the performance trace, and wherein the trace manager sends the message to disable to a managed bean of a single server node of the plurality of server nodes in the cluster of servers, the message to disable the performance trace being sent by the trace manager only to the server node selected by the dispatcher.

14. The performance trace system of claim 13, wherein the managed bean of the server node selected to receive the message to disable the performance trace is to forward the message to disable to a managed bean of each of the other server nodes of the plurality of server nodes in the cluster of servers.

15. The performance trace system of claim 14, wherein the server node selected to receive the message to disable the performance trace from the trace manager is not the server node selected to receive the message to enable the performance trace.

16. The performance trace system of claim 10, wherein the managed bean of each server node of the plurality of server nodes is visible to the managed beans of each of the other server nodes of the plurality of server nodes.

17. The performance trace system of claim 10, wherein the selection by the dispatcher of the server node for receipt of the message to enable the performance trace from among any of the plurality of server nodes is based on load balancing considerations.

18. A machine-readable storage medium having stored thereon data representing sequences of instructions that, when executed by a machine, cause the machine to perform operations comprising:

generating by a system administration unit a message to request enabling a performance trace of a computer application, the computer application running on a plurality of server nodes of a cluster of servers;

selecting by a dispatcher a single server node of the plurality of server nodes for receipt of the message to enable the performance trace and transmitting the message only to the selected server node, wherein the selected server node may be any of the plurality of server nodes;

receiving the message at a managed bean on the selected server node;

enabling a performance trace of the computer application on the selected server node in response to receipt of the message;

forwarding the message from the managed bean of the selected server node to a managed bean of each other server node of the plurality of server nodes to enable the performance trace on each server node of the plurality of server nodes;

enabling the performance trace of the computer application on each of the other server nodes in response to the forwarded message from the selected server node;

performing the performance trace of the computer program on each of the server nodes of the plurality of server nodes; and storing a set of trace data obtained from the performance trace.

19. The medium of claim 18, wherein the message to enable the performance trace received by the selected server node and the forwarded message sent by the selected server node to the other server nodes are JMX (Java management extensions) messages.

20. The medium of claim 18, wherein the selection by the dispatcher of the server node for receipt of the message to enable the performance trace from among any of the plurality of server nodes is based on load balancing considerations.

21. The medium of claim 18, wherein the sequences of instructions further include instructions that, when executed by a machine, cause the machine to perform operations comprising:

subsequent to the enabling of the performance trace on the plurality of server nodes, selecting by the dispatcher a single server node of the plurality of server nodes for receipt of a message to request disabling the performance trace and transmitting the message to disable the performance trace only to the selected server node, wherein the server node selected for the message to disable the performance trace may be any of the plurality of server nodes;

receiving the message to disable the performance trace at a managed bean of the selected server node;

forwarding the message to disable the performance trace from the managed bean of the server node selected for the disable message, the message being sent to a managed bean of each of the other server nodes of the plurality of server nodes; and disabling the trace session at each server node of the plurality of server nodes in response to receipt of the messages to disable.

22. The medium of claim 18, wherein the managed bean of each server node of the plurality of server nodes is visible to the managed beans of each of the other server nodes of the plurality of server nodes.

* * * * *